United States Patent
Goto et al.

(10) Patent No.: US 7,998,258 B2
(45) Date of Patent: Aug. 16, 2011

(54) GAS FILTERING DEVICE

(75) Inventors: Isao Goto, Toyota (JP); Shigeru Hizakae, Aichi-ken (JP); Kazuya Tanaka, Nagoya (JP)

(73) Assignees: Toyota Jidosha Kabushiki Kaisha, Toyota-shi (JP); Toyota Boshoku Kabushiki Kaisha, Kariya-shi (JP)

( * ) Notice: Subject to any disclaimer, the term of this patent is extended or adjusted under 35 U.S.C. 154(b) by 299 days.

(21) Appl. No.: 12/376,848

(22) PCT Filed: Jul. 31, 2007

(86) PCT No.: PCT/JP2007/065319
§ 371 (c)(1),
(2), (4) Date: Apr. 24, 2009

(87) PCT Pub. No.: WO2008/018396
PCT Pub. Date: Feb. 14, 2008

(65) Prior Publication Data
US 2010/0154643 A1    Jun. 24, 2010

(30) Foreign Application Priority Data

Aug. 10, 2006 (JP) ................. 2006-218627

(51) Int. Cl.
B01D 46/52 (2006.01)
B01D 53/02 (2006.01)
F02M 35/024 (2006.01)
(52) U.S. Cl. ........................ 96/134; 55/385.3
(58) Field of Classification Search ............ 96/134, 96/135, 139, 152, 154; 95/146; 55/385.3, 55/511; 123/198 E
See application file for complete search history.

(56) References Cited

U.S. PATENT DOCUMENTS

| 3,017,698 | A |   | 1/1962  | Hambrecht et al. |
|-----------|---|---|---------|------------------|
| 3,388,536 | A |   | 6/1968  | Nash             |
| 3,941,034 | A |   | 3/1976  | Helwig et al.    |
| 4,255,173 | A | * | 3/1981  | Mayer et al. ............ 55/329 |
| 4,418,662 | A | * | 12/1983 | Engler et al. ............ 96/133 |
| 4,921,512 | A |   | 5/1990  | Maryyanek et al. |
| 5,022,901 | A |   | 6/1991  | Meunier          |
| 5,052,385 | A |   | 10/1991 | Sundstrom        |
| 5,158,077 | A |   | 10/1992 | Sundstrom        |
| 5,195,527 | A |   | 3/1993  | Hicks            |
| 5,417,678 | A |   | 5/1995  | Baumann et al.   |
| 5,795,361 | A | * | 8/1998  | Lanier et al. ............ 55/502 |
| 5,879,423 | A |   | 3/1999  | Luka et al.      |
| 7,501,013 | B2| * | 3/2009  | Oda ................ 96/154 |

(Continued)

FOREIGN PATENT DOCUMENTS

DE    195 24 661    1/1996

(Continued)

*Primary Examiner* — Frank M Lawrence
(74) *Attorney, Agent, or Firm* — Oblon, Spivak, McClelland, Maier & Neustadt, L.L.P.

(57) ABSTRACT

A gas filtering device includes a housing (20,30), a flexible filter sheet (41), an inlet port (21), an outlet port (31), and a displacement restriction portion (41a) is provided. The flexible filter sheet (41) divides the interior of the housing into an inlet chamber and an outlet chamber. The filter sheet (41) has a portion that allows passage of gas. The inlet port is connected to the inlet chamber, and conducts gas into the inlet chamber. The outlet port is connected to the outlet chamber, and conducts gas from the inlet chamber to the/outlet chamber through the filter sheet. The outlet port has an opening close to the gas passing portion of the filter sheet. The displacement restricting portion (41a) restricts displacement of the gas passing portion toward the opening.

10 Claims, 6 Drawing Sheets

U.S. PATENT DOCUMENTS

| | | | |
|---|---|---|---|
| 7,507,279 B2* | 3/2009 | Mizutani et al. | 96/135 |
| 2002/0124733 A1 | 9/2002 | Iriyama et al. | |
| 2002/0129711 A1 | 9/2002 | Oda et al. | |
| 2003/0116021 A1 | 6/2003 | Oda et al. | |
| 2004/0237790 A1 | 12/2004 | von Blucher et al. | |

FOREIGN PATENT DOCUMENTS

| | | |
|---|---|---|
| DE | 195 08 534 | 9/1996 |
| DE | 103 18 053 | 2/2005 |
| EP | 0 269 589 | 6/1988 |
| GB | 2 223 423 | 4/1990 |
| GB | 2 231 509 | 11/1990 |
| JP | 3044054 | 9/1997 |
| JP | 2000-310163 | 11/2000 |
| JP | 2002-221106 | 8/2002 |
| JP | 2002 276486 | 9/2002 |
| JP | 2003 42017 | 2/2003 |
| WO | 85 02351 | 6/1985 |

* cited by examiner

Fig. 3
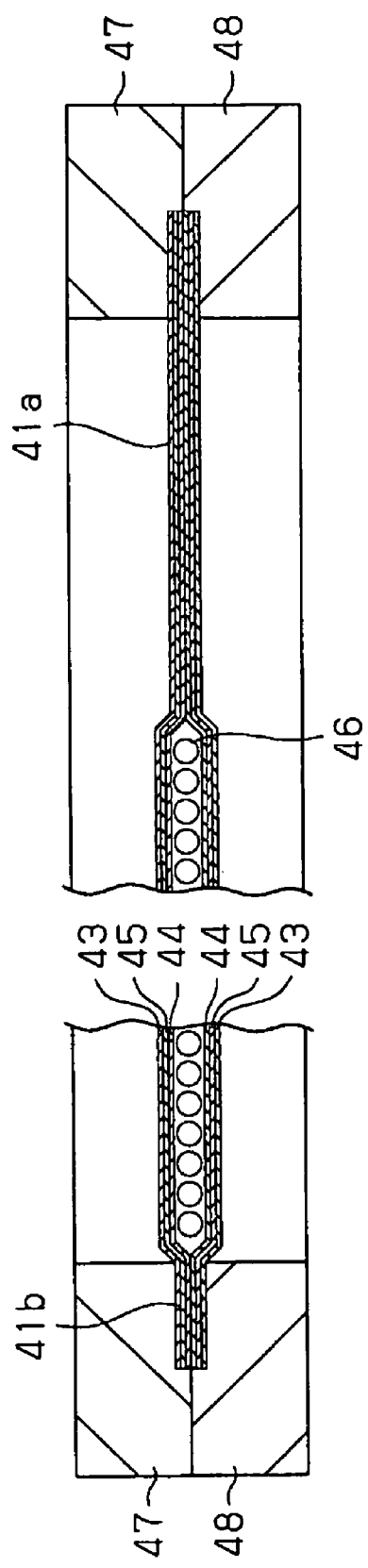
(a)
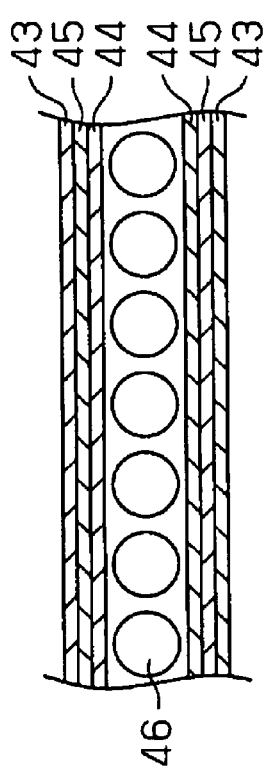
(b)

GAS FILTERING DEVICE

FIELD OF THE INVENTION

The present invention relates to a gas filtering device having a flexible filter sheet.

BACKGROUND OF THE INVENTION

The intake system of a typical internal combustion engine has an air cleaner that includes a trap element for trapping foreign matter such as dust in intake air. In recent years, to suppress the leakage of fuel vapor to the atmosphere through an intake system from the combustion chamber of an internal combustion engine when the engine is not running, air cleaners have been developed that include a filter sheet for adsorbing fuel vapor. The filter sheet is located upstream of a trap element. For example, Japanese Laid-Open Patent Publication No. 2002-276486 discloses such an air cleaner. Specifically, a flexible filter sheet formed by sandwiching granular activated carbon with nonwoven fabric sheets and heat-resistant nets is arranged in a housing, while being laid on a trap element. The filter sheet and the trap element divide the interior of the housing into an inlet chamber and an outlet chamber. An inlet port is connected to the inlet chamber. The inlet chamber is exposed to the atmosphere through the inlet port and an intake duct connected to the inlet port. On the other hand, an outlet port is connected to the outlet chamber. The outlet chamber is connected to the combustion chamber of an internal combustion engine through the outlet port and an intake manifold connected to outlet port.

When the engine is running, air drawn into the inlet chamber from the atmosphere through the intake duct and the inlet port first passes the trap element of the above air cleaner. The trap element traps dust in the intake air. The filtered air flows into the outlet chamber after passing the filter sheet, and is then drawn into the combustion chamber through the outlet port and the intake manifold. On the other hand, when the engine is not running; fuel vapor can flow into the outlet chamber from the combustion chamber through the intake manifold and the outlet port. In such a case, the fuel vapor is adsorbed by the granular activated carbon of the filter sheet, so that the fuel vapor is prevented from leaking into the atmosphere.

As described above, the filter sheet described above is closer to the outlet port than the trap element. In other words, the filter sheet is located downstream from the trap element with respect to the flowing direction of intake air. Thus, when the engine is running, the flow of intake air can displace the filter sheet toward the downstream. Particularly, a part of the filter sheet that is close to the opening of the outlet port and allows passage of intake air is likely to be displaced since great amount of air passes through the part. Such displacement substantially reduces the cross-sectional area of airflow in the vicinity of the outlet port. This may hinder smooth flow of air flowing into the opening of the outlet port, which increases the flow resistance in the intake system.

Also, when passing through the filter sheet, air can cause ruffling of the filter sheet. This causes pulsation of the intake air. Such pulsation of intake air can cause the intake performance of an internal combustion engine to deteriorate.

These drawbacks are not particularly unique to the air cleaner provided in the intake system of an internal combustion engine described above, but are commonly observed in other types of gas filtering devices provided with a flexible filter sheet.

SUMMARY OF THE INVENTION

Accordingly, it is an objective of the present invention to provide a gas filtering device that suppresses drawbacks such as increase of the flow resistance due to displacement of a filter sheet and pulsation of gas.

According to an aspect of the invention, a gas filtering device including a housing, a flexible filter sheet, an inlet port, an outlet port, and a displacement restriction portion is provided. The flexible filter sheet divides the interior of the housing into an inlet chamber and an outlet chamber. The filter sheet has a portion that allows passage of gas. The inlet port is connected to the inlet chamber, and conducts gas into the inlet chamber. The outlet port is connected to the outlet chamber, and conducts gas from the inlet chamber to the outlet chamber through the filter sheet. The outlet port has an opening close to the gas passing portion of the filter sheet. The displacement restricting portion restricts displacement of the gas passing portion toward the opening.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which:

FIGS. 3(*a*) and 3(*b*) are partially enlarged views of FIG. 2;

DETAILED DESCRIPTION OF THE PREFERRED EMBODIMENTS

Figure 1:
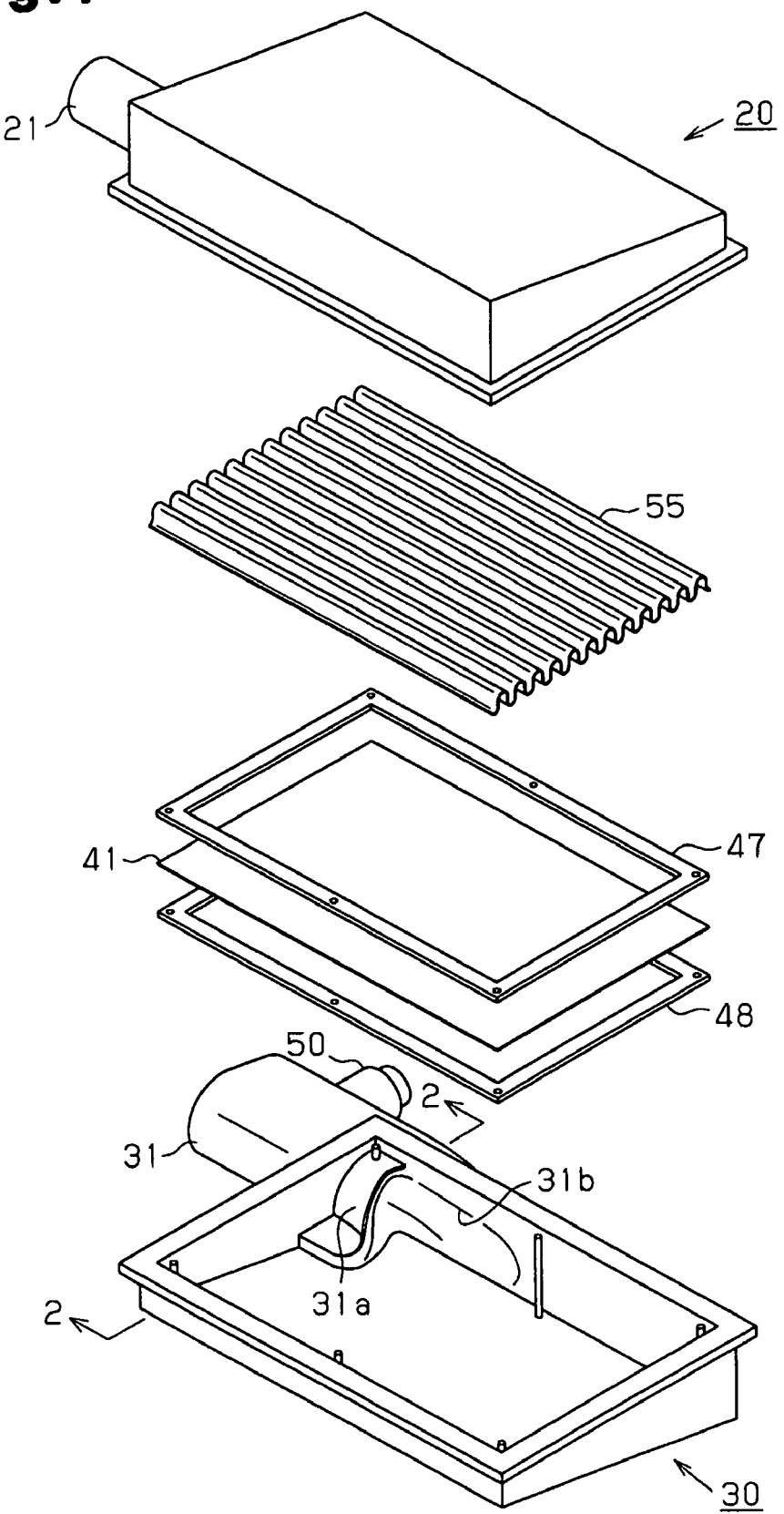
FIG. 1 is an exploded perspective view illustrating an air cleaner.
Figure 2:
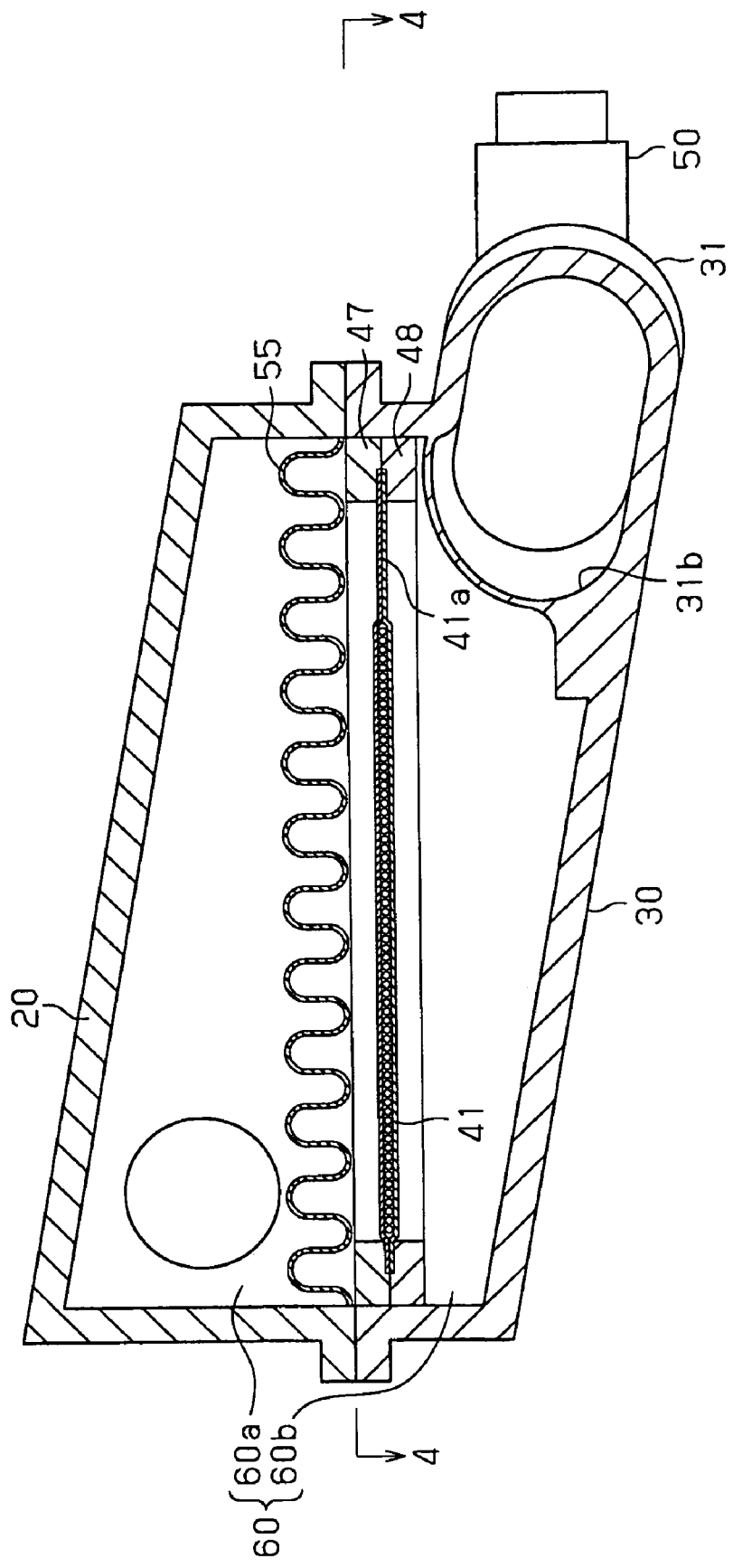
FIG. 2 is a cross-sectional view taken along line 2-2 of FIG. 1, illustrating the air cleaner in an assembled state.

An air cleaner according to one embodiment of the present invention will be described with reference to FIGS. 1 to 4. The air cleaner is mounted in an intake system of an internal combustion engine. FIG. 1 is an exploded perspective view illustrating the air cleaner, and FIG. 2 is a cross-sectional view taken along line 2-2 of FIG. 1, illustrating the air cleaner in the assembled state. FIG. 3 is a partially enlarged view of FIG. 2.

As shown in FIGS. 1 and 2, the air cleaner, which functions as a gas filtering device, has an inlet housing 20 and an outlet housing 30. The housings 20, 30 are airtightly fixed to each other with fastening members (not shown). A filter chamber 60, which is defined by the housings 20, 30, accommodates a trap element 55 and a filter sheet 41 in an overlapping manner. The trap element 55 traps foreign matter such as dust in air and the filter sheet 41 adsorbs fuel vapor. The trap element 55 and the filter sheet 41 divide the filter chamber 60 into an inlet chamber 60*a* and an outlet chamber 60*b*. The filter sheet 41 is located on the side of the outlet chamber 60*b*.

The trap element 55 is corrugated, and is fixed to the inlet housing 20 and the outlet housing 30 at the periphery. As shown in FIG. 3, the filter sheet 41 has a multi-layer structure and includes an adsorption layer 46 containing granular activated carbon and a pair of laminated bodies. Each laminated body includes a polypropylene (PP) mesh layer 43, a nonwoven fabric layer 45, and a glass fiber mesh layer 44, which are laminated from the outer side toward the inner side. The adsorption layer 46 is held between the laminated bodies. The filter sheet 41 is fixed to the outlet housing 30 with its peripheral portion 41b being held between an upper frame 47 and a lower frame 48. The peripheral portion 41b does not have the adsorption layer 46.

The inlet housing 20 is integrally formed with an inlet port 21, and the outlet housing 30 is integrally formed with an outlet port 31. The inlet chamber 60a is exposed to the atmosphere through the inlet port 21 and an intake duct (not shown) connected to the inlet port 21. On the other hand, the outlet chamber 60b is connected to a combustion chamber (not shown) of the engine through the outlet port 31 and an intake manifold (not shown) connected to the outlet port 31. An air flowmeter 50 is located in the outlet port 31 to detect the flow rate of air drawn into the combustion chamber of the engine.

As shown in FIG. 1, the outlet port 31 has an extension 31a that extends parallel with the filter sheet 41 and into the outlet chamber 60b. To allow air to smoothly flow from the outlet chamber 60b into the outlet port 31, the extension 31a is shaped like a funnel such that the cross-sectional area gradually decreases from its opening 31b toward the downstream side.

When the engine is running, air drawn into the inlet chamber 60a from the atmosphere through the intake duct and the inlet port 21 first passes the trap element 55 of the air cleaner. The trap element 55 traps foreign manner such as dust in the intake air. The filtered air flows into the outlet chamber 60b after passing the filter sheet 41, and is then drawn into the combustion chamber through the outlet port 31 and the intake manifold. On the other hand, when the engine is not running, fuel vapor can flow into the outlet chamber 60b from the combustion chamber of the engine through the intake manifold and the outlet port 31. In such a case, the fuel vapor is adsorbed by the adsorption layer 46 of the filter sheet 41, so that the fuel vapor is prevented from leaking into the atmosphere.

The filter sheet 41 is located closer to the outlet port 31 than the trap element 55. In other words, the filter sheet 41 is located downstream from the trap element 55 with respect to the flowing direction of intake air. Thus, when the engine is running, the flow of intake air can displace the filter sheet 41 toward the downstream. Particularly, a part of the filter sheet 41 that is close to the opening 31b of the outlet port 31 and allows passage of intake air is likely to be displaced since the flow rate of the air that passes through the part is great. Such displacement reduces the cross-sectional area of airflow in the vicinity of the outlet port 31. This may hinder smooth flow of air flowing into the opening 31b of the outlet port 31, which increases the flow resistance in the intake system.

Also, when passing through the filter sheet 41, intake air can cause ruffling of the filter sheet 41. This causes pulsation of the intake air.

In this embodiment, to modularize the intake system of the engine, an air flowmeter 50 is located in the outlet port 31, which is formed integrally with the outlet housing 30. In this construction, pulsation of intake air caused by displacement of the filter sheet 41 is generated in the vicinity of the air flowmeter 50. This is likely to degrade the detection accuracy of the flowmeter 50.

Figure 4:
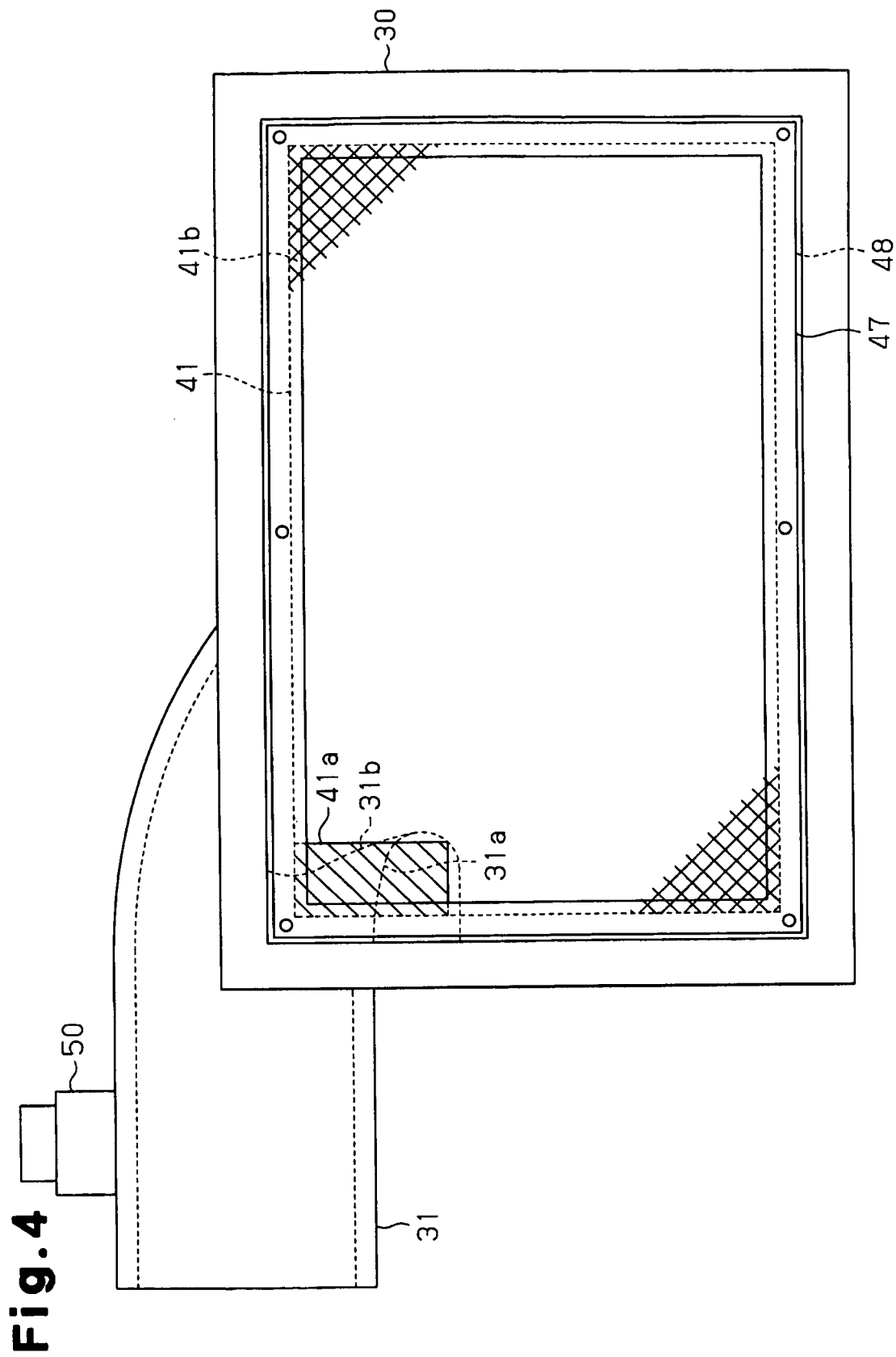
FIG. 4 is a cross-sectional view taken along line 4-4 of FIG. 2.

The air cleaner of the present embodiment has a configuration that remedies such drawbacks. Hereafter, the configuration will be described with reference to FIGS. 2 to 4. FIG. 4 is a cross-sectional view taken along line 4-4 of FIG. 2.

As shown in FIGS. 2 to 4, a rectangular hardened portion 41a, in which the adsorption layer 46 is absent, is formed in a portion of the filter sheet 41 that corresponds to the extension 31a. The hardened portion 41a covers the proximal portion of the extension 31a. The hardened portion 41a is provided by pressing and heating the corresponding portion, and includes the nonwoven fabric layers 45, the glass fiber mesh layer 44, and the molten PP mesh layers 43, which are closely pressure bonded to the layers 45, 44. Therefore, the hardened portion 41a has a higher rigidity than the remainder of the filter sheet 41. The hardened portion 41a is fixed to the outlet housing 30 by tightly holding a part of its periphery by the frames 47, 48.

The above illustrated embodiment provides the following advantages.

The hardened portion 41a is formed to cover the extension 31a, and is adjacent to a portion that is close to the opening 31b of the outlet port 31 and allows passage of intake air. This restricts displacement of the gas passing portion toward the opening 31b of the outlet port 31, so that a smooth flow of intake air into the opening 31b is ensured. An increase of the flow resistance due to such displacement is also restricted. Also, ruffling of the filter sheet 41 caused by intake air passing through the filter sheet is restricted. This reduces the pulsation of intake air at the outlet port 31 and in portions downstream of the outlet port 31. Therefore, deterioration of the intake performance of the engine due to increase in the flow resistance and pulsation of intake air is suppressed. Also, the detection accuracy of the air flowmeter 50 and the accuracy of various engine control procedures executed based on detection signals of the air flowmeter 50 are prevented from being degraded.

The hardened portion 41a functions as a displacement restricting portion that restricts displacement of the filter sheet 41 toward the opening 31b, and is formed as a portion of the filter sheet 41. Thus, unlike a case in which a displacement restricting portion is configured differently, for example, by supporting the filter sheet 41 with separate members fixed to the outlet housing 30, no additional member separate from the filter sheet 41 is required. The structure of the air cleaner is thus simplified while ensuring that displacement of the filter sheet 41 is restricted.

When the filter sheet 41, which includes the PP mesh layers 43 made of a resin material, is partially pressed, the PP mesh layers 43 are pressure bonded to the other layers, which hardens the pressed portion. According to the present embodiment, the hardened portion 41a is easily formed through pressing. The PP mesh layers 43 are made of a thermoplastic resin material. Therefore, by pressing and heating the filter sheet 41, the PP mesh layers 43 is melted or softened, and thus pressure bonded to the other layers. This further increases the rigidity of the hardened portion 41a. In the present embodiment, the PP mesh layers 43 on both sides are melted by pressing and heating the filter sheet 41, so that the PP mesh layers 43 are bonded to each other with other layers in between. This further increases the rigidity of the hardened portion 41a. Therefore, the hardened portion 41a having an increased rigidity is formed, so that displacement of the filter sheet 41 is reliably restricted.

Since the hardened portion 41a is fixed to the outlet housing 30, the position of the hardened portion 41a in relation to the outlet housing 30 is restricted. This further restricts displacement of the filter sheet 41.

If a hardened portion is formed by pressing, the layers of the filter sheet 41 are closely bonded together so that gas is unlikely to pass through the hardened portion. As a result, it is of concern that the formation of a hardened portion in the filter sheet 41 increases the flow resistance of the filter sheet 41 when intake air passes through the filter sheet 41. According to the present embodiment, the outlet port 31 extends into the outlet chamber 60b along a direction parallel to the filter sheet 41, and opens at the distal end. Thus, an extremely small amount of gas flows into the outlet chamber 60b after passing through the portion of the filter sheet 41 that corresponds to the extension 31a. According to the present embodiment, since the hardened portion 41a is formed at a position that corresponds to the extension 31a, the amount of gas that passes through the hardened portion 41a is reduced. This minimizes the increase of the flow resistance due to the formation of the hardened portion 41a.

The above embodiment may be modified as follows.

Figure 5:
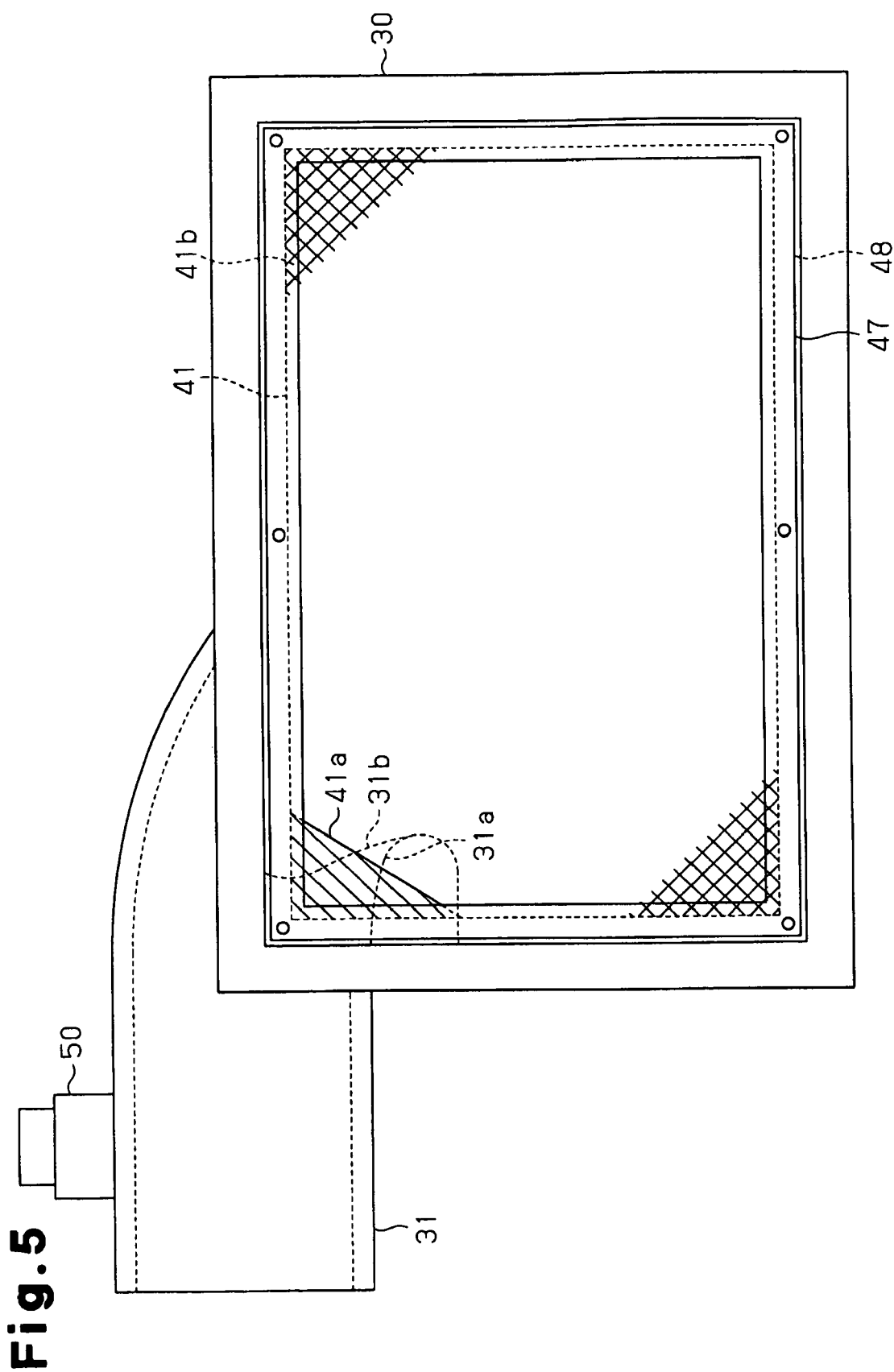
FIG. 5 is a cross-sectional view illustrating a modification of the shape of a hardened portion of a filter sheet.

The hardened portion 41a does not need to have a rectangular shape, but may have a different shape as long as the shape corresponds to the shape of the extension 31a. For example, the hardened portion 41a may have a shape shown in FIG. 5 to correspond to a triangular extension 31a.

In the illustrated embodiment, the hardened portion 41a is formed with the filter sheet 41 having the PP mesh layers 43 formed of a thermoplastic resin material that can be partially pressed and heated. However, the hardened, portion 41a may be formed with a filter sheet that cannot be hardened through pressing. For example, the rigidity of the filter sheet can be partially increased by changing the material of the filter sheet or by partially changing the thickness.

Figure 6:
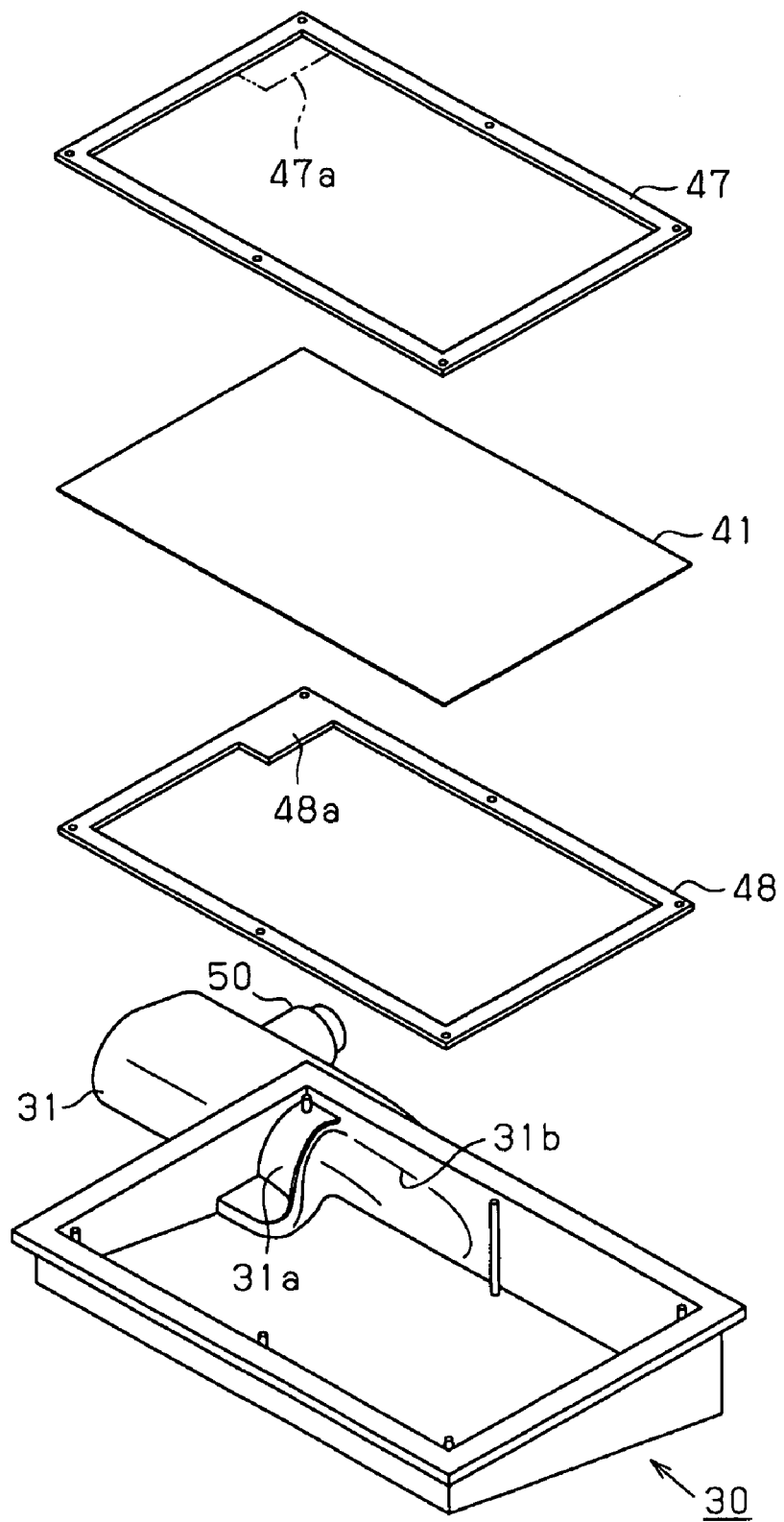
FIG. 6 is an exploded perspective view illustrating a modification of displacement restricting portion that restricts displacement of a filter sheet.

A displacement restricting portion that restricts displacement of the filter sheet 41 toward the opening 31b may be a structure other than the hardened portion 41a of the filter sheet 41. For example, as shown in FIG. 6, a support portion 48a formed in a portion of the lower frame 48 that is closer to the outlet port 31 than the filter sheet 41 may function as a displacement restricting portion. Further, as illustrated by an alternate long and two short dashes line in FIG. 6, a support portion 47a formed in a portion of the upper frame 47 that corresponds to the support portion 48a of the lower frame 48 may function as a displacement restricting portion. By holding a part of the filter sheet 41 with these support portions 47a, 48a, ruffling of the filter sheet 41 is reliably suppressed. Instead, both of the hardened portion 41a and the support portions 47a, 48a formed on the frames 47, 48 may be used as displacement restricting portions by supporting the hardened portion 41a by the support portions 47a, 48a.

In the above illustrated embodiment, the hardened portion 41a is immovably fixed to the outlet housing 30 by holding a part of the hardened portion 41a between the frames 47, 48. Instead, the hardened portion 41a may be formed in a portion that is not held between the frames 47, 48 if the hardened portion 41a itself exerts sufficient displacement restricting performance.

The extension 31a, which extends into the outlet chamber 60b of the outlet port 31, may be omitted. In this case, a part of the filter sheet 41 that is close to the opening of the outlet port 31 may be hardened.

If the outermost mesh layers 43 are capable of reliably holding the adsorption layer 46 formed of activated carbon, the mesh layers 44 adjacent to the adsorption layers 46 may be omitted. The mesh layers 43, 45 do not need to be formed of PP or glass fiber, but may be formed of other resin materials such as nylon. In short, any type of filter sheet having other structure may be used as long as the sheet is capable of filtering air that passes through the air cleaner.

The air cleaner according to the illustrated embodiment has the filter sheet 41 that is located downstream of the trap element 55 with respect to the direction in which intake air flows, and that adsorbs fuel vapor entering through the outlet port 31 when the engine is not running. In contrast to this, the present invention may be applied to other types of air cleaners that have a flexible filter sheet for trapping foreign matter mixed in the air drawn from the inlet port 21. Further, the present invention does not need to be applied to the air cleaner in an engine intake system, but may be applied to other types of gas filtering device that is provided with a flexible filter sheet.

The invention claimed is:

1. A gas filtering device comprising:
a housing;
a flexible filter sheet that divides the interior of the housing into an inlet chamber and an outlet chamber, the filter sheet having a portion that allows passage of gas;
an inlet port connected to the inlet chamber, the inlet port conducting gas into the inlet chamber;
an outlet port connected to the outlet chamber, the outlet port conducting gas that flows from the inlet chamber to the outlet chamber through the filter sheet out of the outlet chamber, wherein the outlet port has an opening; and
a displacement restricting portion that restricts displacement of a part of the gas passing portion of the filter sheet in the vicinity of the opening toward the opening, wherein the displacement restricting portion is positioned only adjacent to the part of gas passing portion in the vicinity of the opening.

2. The filtering device according to claim 1, wherein the displacement restricting portion includes a portion of the filter sheet having a higher rigidity than the reminder of the filter sheet.

3. The filtering device according to claim 2, wherein the portion with increased rigidity is formed by partially hardening the filter sheet.

4. The gas filtering device according to claim 3, wherein the filter sheet has a multi-layered structure including a mesh layer made of a resin material, wherein the hardened portion has a pressed multi-layered structure formed by pressing the mesh layer and other layers of the filter sheet.

5. The gas filtering device according to claim 4, wherein the mesh layer is made of a thermoplastic resin material.

6. The gas filtering device according to claim 5, wherein the mesh layer is one of a pair of mesh layers that are arranged on opposite sides of the filter sheet.

7. The gas filtering device according to claim 4, wherein the outlet port has an extension that extends along a direction parallel to the filter sheet and into the outlet chamber, the extension having an opening at the distal end, wherein the hardened portion is formed at a portion of the filter sheet adjacent to the part of gas passing portion in the vicinity of the opening to cover the extension.

8. The gas filtering device according to claim 3, wherein the hardened portion is fixed to the housing.

9. The gas filtering device according to claim 1, further comprising a trap element located closer to the inlet port than the filter sheet, wherein the inlet port is exposed to the atmosphere and the outlet port is connected to a combustion chamber of an internal combustion engine, wherein the trap element traps dust in intake air when the engine is running, and wherein the filter sheet adsorbs fuel vapor leaking from the combustion chamber when the engine is not running.

10. The gas filtering device according to claim 9, wherein the outlet port is formed integrally with the housing, wherein an air flowmeter for detecting a flow rate of intake air is provided in the outlet port.

* * * * *